United States Patent
Dhillon et al.

(10) Patent No.: US 12,309,053 B2
(45) Date of Patent: May 20, 2025

(54) METHODS, SYSTEMS, AND DEVICES TO IMPROVE WITHDRAWING BORDER GATEWAY PROTOCOL (BGP) ROUTES WHEN A BGP GATEWAY BECOMES UNREACHABLE

(71) Applicant: CIENA CORPORATION, Hanover, MD (US)

(72) Inventors: Param Preet Singh Dhillon, Gurunagar (IN); Piyush Sharma, Gurgaon (IN); Varun Munjal, Gurgaon (IN); Anil Dharmshaktu, Dwarka (IN)

(73) Assignee: CIENA CORPORATION, Hanover, MD (US)

( * ) Notice: Subject to any disclaimer, the term of this patent is extended or adjusted under 35 U.S.C. 154(b) by 0 days.

(21) Appl. No.: 18/349,548

(22) Filed: Jul. 10, 2023

(65) Prior Publication Data
US 2024/0396824 A1    Nov. 28, 2024

(30) Foreign Application Priority Data
May 22, 2023    (IN) ............................ 2023-11035457

(51) Int. Cl.
*H04L 45/02* (2022.01)
*H04L 45/021* (2022.01)

(52) U.S. Cl.
CPC ............ *H04L 45/04* (2013.01); *H04L 45/021* (2013.01)

(58) Field of Classification Search
CPC ..................................................... H04L 45/04
See application file for complete search history.

(56) References Cited

U.S. PATENT DOCUMENTS

| | | | |
|---|---|---|---|
| 9,397,931 B1* | 7/2016 | Mohanty | H04L 45/28 |
| 9,425,893 B1* | 8/2016 | Srinivasan | H04L 1/00 |
| 10,250,552 B1* | 4/2019 | Sajassi | H04L 41/0663 |
| 10,505,809 B1* | 12/2019 | Sinn | H04L 41/082 |
| 10,623,322 B1* | 4/2020 | Nallamothu | H04L 45/745 |
| 2005/0220102 A1* | 10/2005 | Tschudin | H04L 45/00 370/389 |
| 2006/0233181 A1* | 10/2006 | Raszuk | H04L 45/04 370/401 |
| 2007/0153763 A1* | 7/2007 | Rampolla | H04L 45/26 370/351 |
| 2010/0265956 A1* | 10/2010 | Li | H04L 45/02 370/401 |
| 2012/0066092 A1* | 3/2012 | Swinson | G06Q 30/0613 705/26.41 |
| 2015/0117178 A1* | 4/2015 | Kotalwar | H04L 45/16 370/219 |

(Continued)

FOREIGN PATENT DOCUMENTS

WO    WO-2021174235 A2 *    9/2021    ............. H04L 65/60

*Primary Examiner* — Hieu T Hoang
(74) *Attorney, Agent, or Firm* — Guntin & Gust, PLC; Atanu Das

(57) ABSTRACT

Aspects of the subject disclosure may include, for example, a first BGP device establishing a BGP session between the first BGP device and a second BGP device, generating an identifier associated with the second BGP device during establishment of the BGP session, receiving route advertisements from the second BGP device, associating the identifier with the route advertisements, and providing the identifier with the route advertisements to a third BGP device. Other embodiments are disclosed.

20 Claims, 6 Drawing Sheets

(56) References Cited

U.S. PATENT DOCUMENTS

| | | | | |
|---|---|---|---|---|
| 2016/0378606 | A1* | 12/2016 | Sajassi | H04L 45/22 |
| | | | | 714/4.2 |
| 2017/0288970 | A1* | 10/2017 | Lin | H04L 45/02 |
| 2021/0120109 | A1* | 4/2021 | Ranpise | G06F 16/285 |
| 2021/0250228 | A1* | 8/2021 | Prakash | H04L 41/0893 |
| 2021/0385149 | A1* | 12/2021 | Suryanarayana | H04L 43/0811 |
| 2021/0385151 | A1* | 12/2021 | Bamford | H04L 45/3065 |
| 2023/0198902 | A1* | 6/2023 | Venkatachalapathy | |
| | | | | H04L 45/745 |
| | | | | 370/392 |

\* cited by examiner

METHODS, SYSTEMS, AND DEVICES TO IMPROVE WITHDRAWING BORDER GATEWAY PROTOCOL (BGP) ROUTES WHEN A BGP GATEWAY BECOMES UNREACHABLE

CROSS-REFERENCE TO RELATED APPLICATIONS

This application claims priority under 35 U.S.C. § 1.119 to Indian patent application no. 202311035457, filed on May 22, 2023. All sections of the aforementioned application(s) and/or patent(s) are incorporated herein by reference in their entirety.

FIELD OF THE DISCLOSURE

The subject disclosure relates to methods, systems, and devices to improve withdrawing border gateway protocol (BGP) routes when a BGP gateway becomes unreachable.

BACKGROUND

In a communication network comprising a group of BGP gateways implementing BGP, a BGP update message can be transmitted from a first BGP gateway to a second BGP gateway to update the BGP routing table of the second BGP gateway. Further, the second BGP gateway can advertise the route to other BGP gateways so that they can update their respective BGP routing tables. Further, the first BGP gateway may become unreachable to the second BGP gateway. This can occur due to BGP session flaps, and/or link flaps. A flap is when a session, route, and/or link is unstable (e.g., is in operation then not in operation, over and over again, within a relatively small time period). When the first BGP gateway becomes unreachable, the second BGP gateway sends a message to the other BGP gateways to withdraw all the routes associated with the first BGP gateway. In some situations, this requires the other BGP gateway to implement a withdraw operation for millions of routes from their respective BGP routing tables. The withdrawal operations of these routes can take up a significant amount of processor and memory capacity of each BGP gateway.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for a first BGP device establishing a BGP session between the first BGP device and a second BGP device, generating an identifier associated with the second BGP device during establishment of the BGP session, receiving route advertisements from the second BGP device, associating the identifier associated with the route advertisements, and providing the identifier with the route advertisements to a third BGP device. Other embodiments are described in the subject disclosure.

One or more aspects of the subject disclosure include a first BGP device, comprising a processing system including a processor, and a memory that stores executable instructions that, when executed by the processing system, facilitate performance of operations. The operations can comprise establishing a BGP session between the first BGP device and a second BGP device, generating an identifier associated with the second BGP device during establishment of the BGP session, receiving route advertisements from the second BGP device, associating the identifier with the route advertisements, and providing the identifier with the route advertisements to a third BGP device.

One or more aspects of the subject disclosure include a first BGP device, comprising a processing system including a processor, and a memory that stores executable instructions that, when executed by the processing system, facilitate performance of operations. The operations can comprise generating a BGP routing table, receiving a first BGP update message from a second BGP device, determining an identifier associated with route advertisements for a third BGP device from the first BGP update message, and updating the BGP routing table with the identifier.

One or more aspects of the subject disclosure include a first BGP device, comprising a processing system including a processor, and a memory that stores executable instructions that, when executed by the processing system, facilitate performance of operations. The operations can comprise establishing a BGP session between the first BGP device and a second BGP device, generating an identifier associated with the second BGP device during establishment of the BGP session, receiving route advertisements from the second BGP device, associating the identifier with the route advertisements, and providing a first BGP update message to a third BGP device, wherein the first BGP update message comprises the identifier with the route advertisements.

Figure 1A:
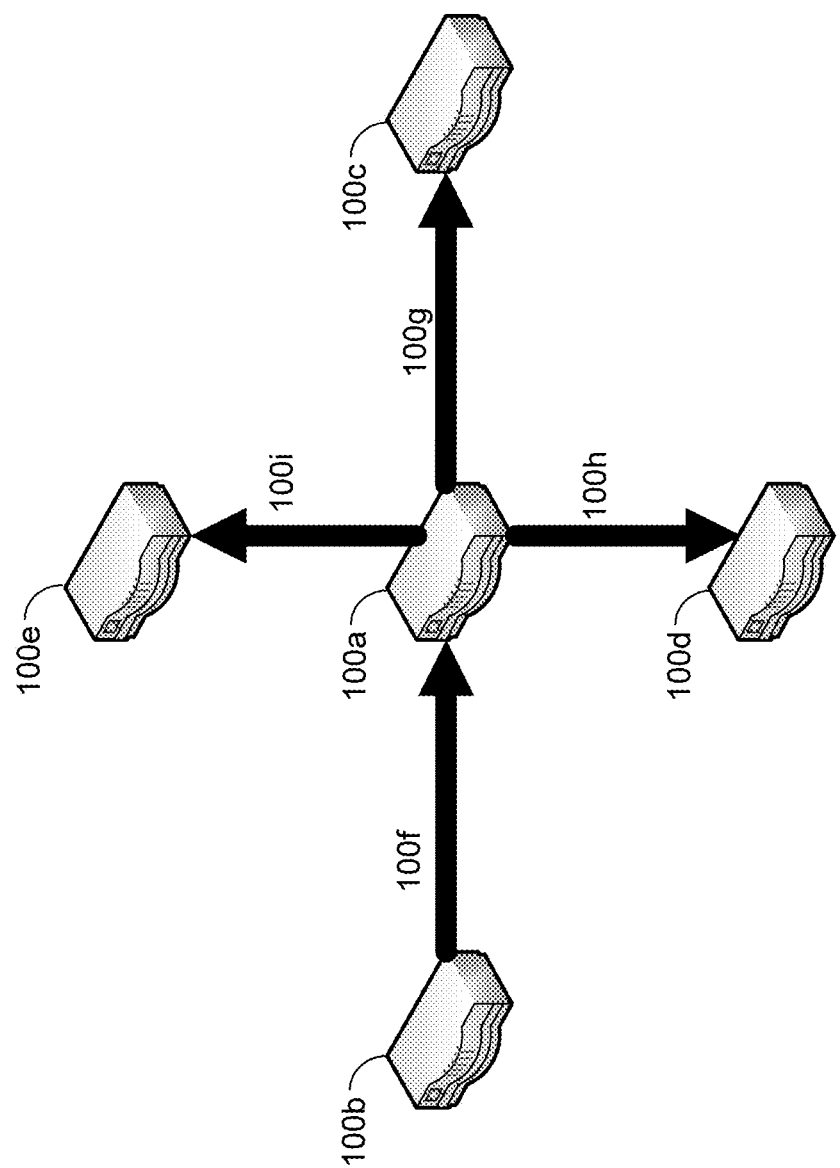
FIGS. 1A, 1B, and 2 are block diagrams illustrating example, non-limiting embodiments of a system functioning in accordance with various aspects described herein.
Figure 1B:
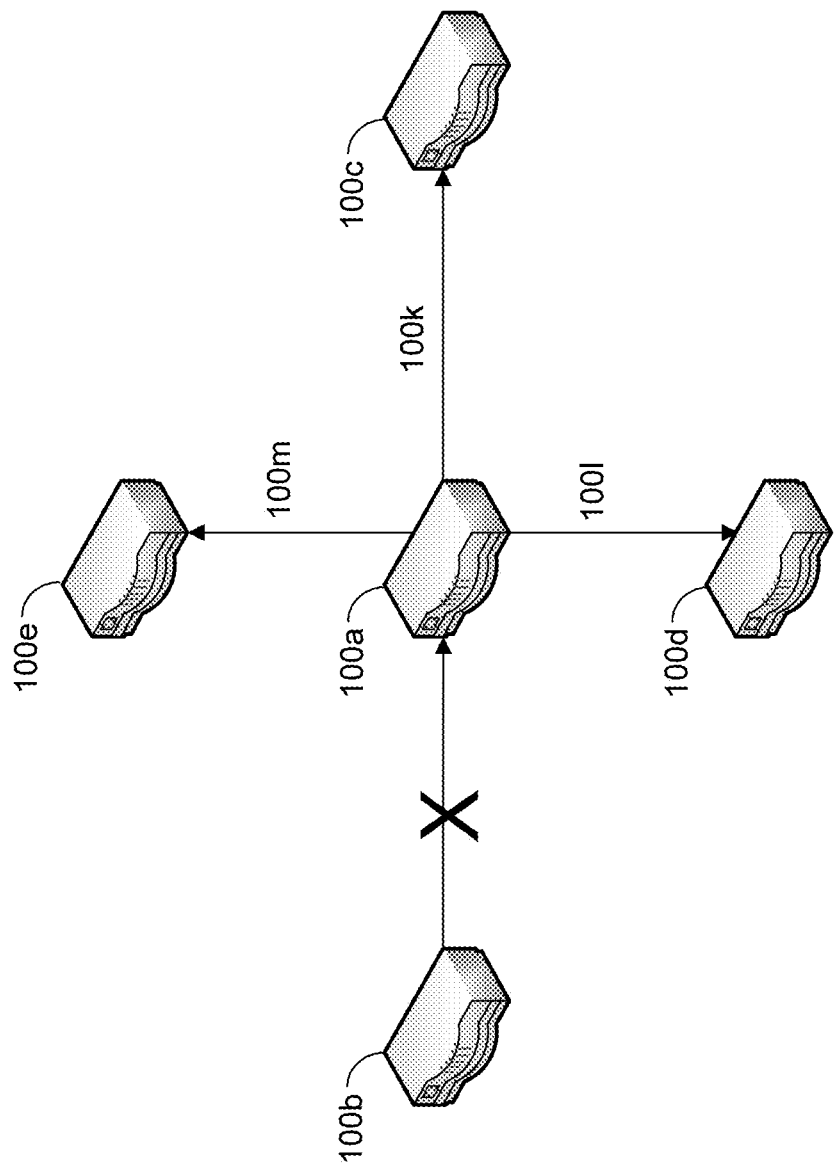
Figure 2:
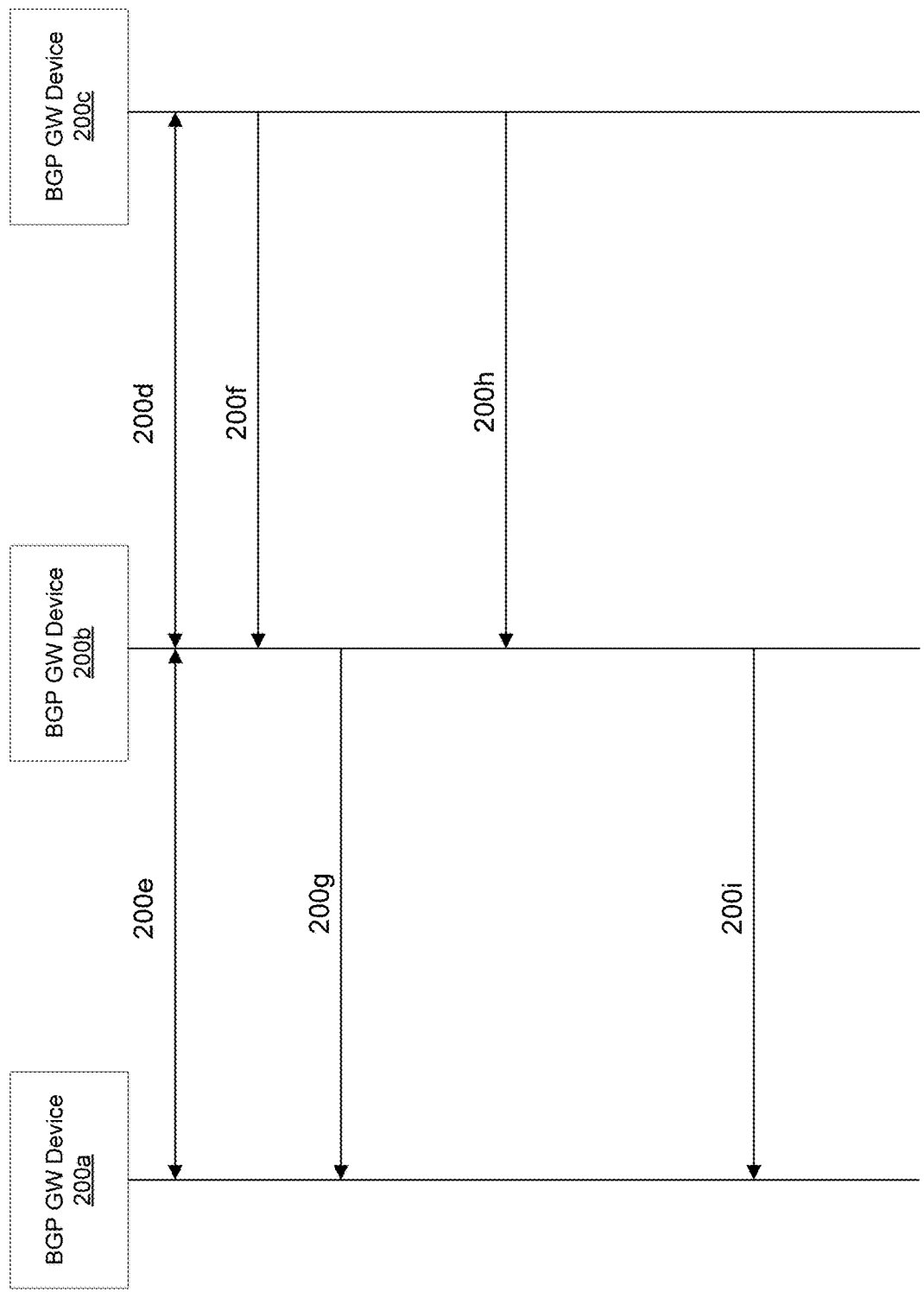

FIGS. 1A, 1B, and 2 are block diagrams illustrating example, non-limiting embodiments of a system functioning in accordance with various aspects described herein.

Referring to FIG. 1A, in one or more embodiments, system 100-1 comprises a BGP gateway device 100a, BGP gateway device 100b, BGP gateway device 100c, BGP gateway device 100d, and BGP gateway device 100e. They communicate with each other over a communication network. This communication network can comprise one or more wired communication networks, one or more wireless communication networks, or a combination thereof.

In one or more embodiments, BGP gateway device 100b provides a BGP update message 100f to BGP device 100a that includes route advertisements (in some embodiments it may be all route advertisements associated with BGP gateway device 100b and in other embodiments it may be a group of route advertisements associated with the BGP gateway device 100b). In response to receiving the BGP update message, the BGP gateway 100a may associate an identifier associated with the route advertisements. Note, the BGP gateway device 100a generates the identifier during establishment of the BGP session between BGP gateway device 100a and BGP gateway device 100b. Further, the BGP gateway device 100a may send a BGP update message 100g to BGP gateway device 100c, send a BGP update message 100h to BGP gateway device 100d, and send a BGP message 100i to BGP gateway device 100e. Each of the BGP update messages can include the identifier with the route advertisements associated with BGP gateway device 100b. Each of BGP gateway device 100d, BGP gateway device 100d, and BGP gateway device 100e can update their respective BGP routing tables (e.g., BGP Routing Information Base (RIB)) based on the identifier and the route advertisements. In some embodiments, the identifier can be an unsigned 32-bit integer positioned in BGP Reach and Unreach Network Layer Reachability information (NLRI) fields. Further, the identifier can be generated locally for each BGP peer per address family. That is, BGP gateway device 100a generates the identifier for the route advertisements received from its peer BGP gateway device 100b. In addition, when BGP gateway device 100a receives the route advertisements from its peer BGP gateway device 100b it associates the identifier with the route advertisements. When it sends BGP update message 100g, BGP update message 100h, and BGP update message 100i, BGP gateway device 100a inserts the identifier in the Reach NLRI field of BGP update message. When each of BGP gateway device 100c, BGP gateway device 100d, and BGP gateway device 100c, receives the respective BGP update message, the respective BGP gateway device can identify the identifier from the BGP update message store the identifier received in the Reach NLRI, in its BGP routing table (e.g., BGP RIB) along with the associated route advertisements. Also, each of BGP gateway device 100c, BGP gateway device 100d, and BGP gateway device 100e maintains a list of prefixes that are from same BGP peer and with same Identifier. (e.g., Key {BGP peer(x)+Peer Identifier in Reach Update}→List of NLRI's with same Identifier from this BGP Peer (x)).

Referring to FIG. 1B, in one or more embodiments, in system 100-2, BGP gateway device 100a determines that BGP gateway device 100b is unreachable. That is, the BGP session, route, and/or communication link may be unstable (e.g., flapping). In some embodiments, BGP gateway 100a has negotiated an enhanced route withdraw capability with BGP gateway device 100c, BGP gateway device 100d, and BGP gateway device 100e. Thus, in response to determining that BPG gateway device 100b is unreachable, the BGP gateway device 100a sends a BGP update message 100k with a prefix and the identifier associated with routes associated with BGP gateway device 100b in its Unreach NLRI field to BGP gateway device 100c. Further, the BGP gateway device 100a sends a BGP update message 100l with a prefix and the identifier associated with routes associated with BGP gateway device 100b in its Unreach NLRI field to BGP gateway device 100d in response to determining BGP gateway device 100b is unreachable. In addition, the BGP gateway device 100a sends a BGP update message 100m with a prefix and the identifier associated with routes associated with BGP gateway device 100b in its Unreach NLRI field to BGP gateway device 100e in response to determining BGP gateway device 100b is unreachable. Each of BGP gateway device 100c, BGP gateway device 100d, and BGP gateway device 100e removes the routes associated with the identifier from its BGP routing table in response to receiving their respective BGP update message and determining that identifier is in the Unreach NLRI field. Thus, instead of sending several (e.g., dozens, hundreds, or thousands) of BGP update messages for each of the routes associated with BGP gateway device 100b that are now unreachable to BGP gateway device 100c, BGP gateway device 100d, and BGP gateway device 100e. BGP gateway device 100a need only send one BGP update message to each of them. Further, instead of implementing several (e.g., dozens, hundreds, or thousands) of withdraw operations on their respective BGP tables, each of BGP gateway device 100c, BGP gateway device 100d, and BGP gateway device 100e need only implement one withdraw operation based on the identifier. Thus, bandwidth is conserved on the communication links among the BGP gateway 100a, BGP gateway 100c, BGP gateway 100d, and BGP gateway 100e as well as each of BGP gateway 100c, BGP gateway 100d, and BGP gateway 100e conserve processor and memory resources in implementing the one withdraw operation from their respective BGP routing table by utilizing the reduced withdraw operation capability described herein.

Referring to FIG. 2, in one or more embodiments, system 200 can include a transition or flow diagram, aspects of which are implemented by BGP gateway device 200a, BGP gateway device 200b, or BGP gateway device 200c. At an operation 200d, BGP gateway device 200b and BGP gateway device 200c negotiate a conventional BGP session handshake to initiate a conventional BGP session. During the establishment of the conventional BGP session between BGP gateway device 200b and BGP gateway device 200c. BGP gateway device 200b generates a unique identifier Y (e.g., unsigned 32-bit integer) associated with BGP gateway device 200c. Further, at an operation 200c. BGP gateway device 200a and BGP gateway device 200b negotiate a BGP session handshake that includes the reduced withdraw operation capability as discussed when describing FIGS. 1A and 1B to initiate a BGP session accordingly. At an operation 200f. BGP gateway device 200b receives a BGP update message with a number of (e.g., N) reach NLRIs (e.g., route advertisements). At an operation 200g, BGP gateway device 200b sends a BGP update message with the number of (e.g., N) reach NLRIs with each NLRI associated with identifier Y. In response, BGP gateway device 200a assigns an identifier to each of the NLRIs received from BGP gateway device 200b in its BGP routing table. An example BGP routing table entry (e.g., BGP Routing Information Base (RIB)) can be R1→NHOP B (Tx Id Z, Rx Id Y) . . . RN→NHOP B (Tx Id Z, Rx Id Y).

In one or more embodiments, at an operation 200h, BGP gateway device 200b determines that the BGP session with BGP gateway device 200c is terminated. This can be due to BGP session flaps, and/or link flaps. In response, BGP gateway device 200b removes route entries in its BGP routing table (e.g., BGP RIB) associated with BGP gateway device 200c. Further, at an operation 200i, BGP gateway device 200b sends a BGP update message to BGP gateway device 200a that includes only 1 Unreach NLRI that is the identifier Y associated with the routes of BGP gateway device 200c. In response to receiving this BGP update message, BGP gateway device 200a removes route entries in its BGP routing table (e.g., BGP RIB) that include the identifier Y in a single withdraw operation.

Figure 3:
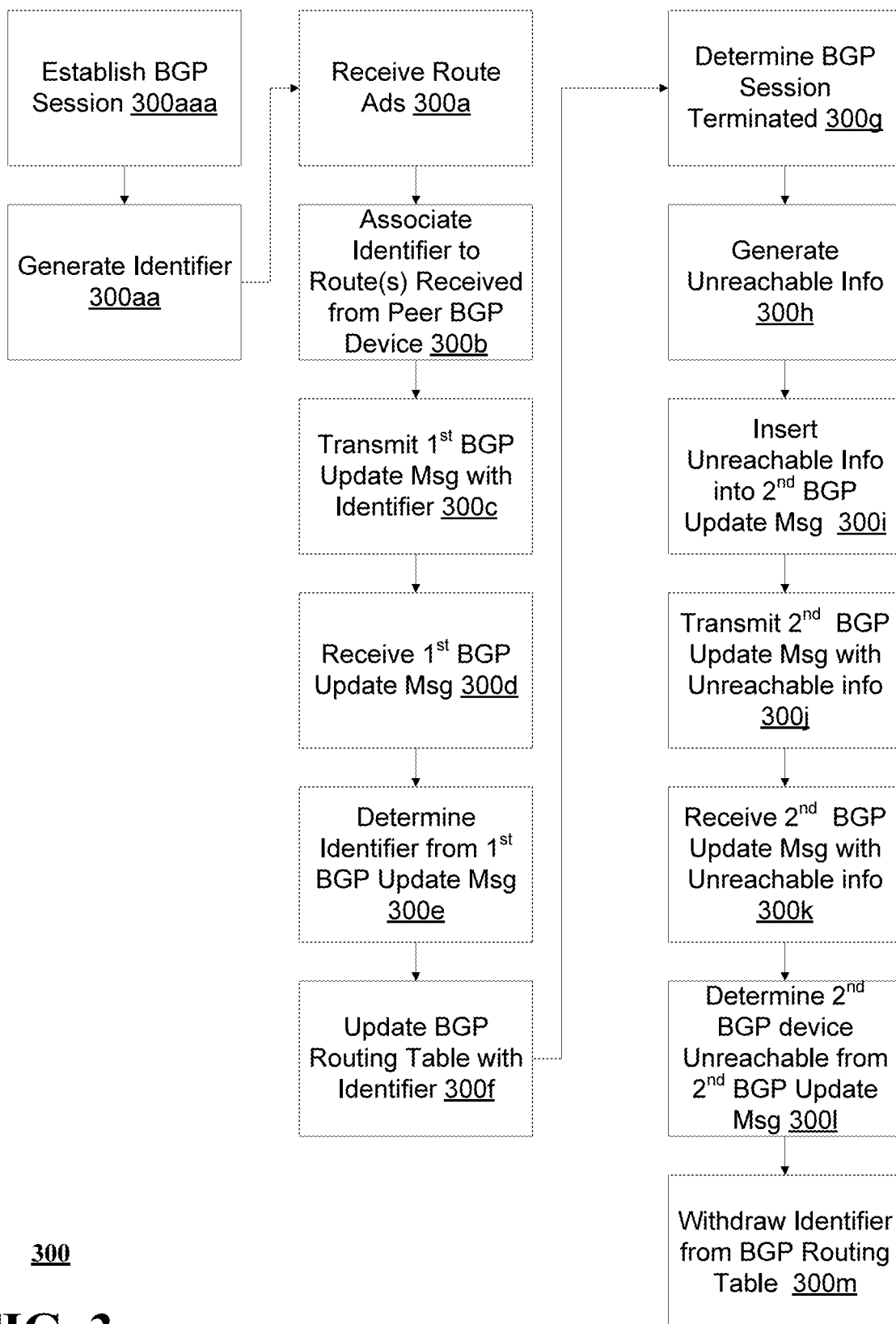
FIG. 3 depicts illustrative embodiments of a method in accordance with various aspects described herein.

FIG. 3 depicts illustrative embodiments of a method 300 in accordance with various aspects described herein. Aspects of method 300 can be implemented by one or more BGP gateway devices. The method 300 can include the first BGP device, 300aaa, establishing a BGP session between the first BGP device and a second BGP device. Further, the method 300 can include the first BGP device, at 300aa, generating an identifier associated with the second BGP device during establishment of the BGP session. The method 300 can include a first BGP device, at 300a, receiving route advertisements from the second BGP device. Further, the method 300 can include the first BGP device, at 300b, associating the identifier with the advertisements. In addition, the method 300 can include the first BGP device, at 300c, providing the identifier with the route advertisements to a third BGP device by transmitting a first BGP update message with the identifier. In some embodiments, the generating the identifier comprises generating an unsigned 32-bit integer. In other embodiments, the providing of the identifier comprises inserting the unsigned 32-bit integer within a Reach Network Layer Reachability Information (NLRI) field of the first BGP update message.

In one or more embodiments, the method 300 includes the third BGP device, at 300d, receiving the first BGP update message from the first BGP device. Further, the method 300 includes the third BGP device, at 300e, determining the identifier from the first BGP update message. In addition, the method 300 includes the third BGP device, at 300f, updating a BGP routing table (e.g., BGP RIB) with the identifier. That is, the third BGP device stores the identifier in its BGP routing tables and associates it with the routes of the second BGP device.

In one or more embodiments, the method 300 can include the first BGP device determining the BGP session between the first BGP device and the second BGP device is terminated resulting in a determination. Further, the method 300 can include the first BGP device, at 300g, generating unreachable information associated with the second BGP device. In some embodiments the unreachable information comprises the identifier. In addition, the method 300 can include the first BGP device, at 300i, inserting the unreachable information into a second BGP update message. In other embodiments, the unreachable information comprises the identifier within an Unreach Network Layer Reachability Information (NLRI) field of the second BGP update message.

In one or more embodiments, the method 300 can include the first BGP device, at 300j, transmitting the second BGP update message to the third BGP device. Further, the method 300 can include the third BGP device, at 300k, receiving the second BGP update message. In addition, the method 300 can include the third BGP device, at 300l, determining that the second BGP device is unreachable based on the unreachable information. Also, the method 300 can include the third BGP device, at 300m, withdrawing the identifier and the route advertisements from the BGP routing table based on the unreachable information.

In one or more embodiments, prior to receiving the route advertisements, negotiating the BGP session with the third BGP device resulting in a negotiated BGP session. The negotiated BGP session includes a reduced withdraw operation capability.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein among FIG. 3. Moreover, not all illustrated blocks may be required to implement the methods described herein. Note, one or more blocks can be performed in response to one or more other blocks among those shown in FIG. 3.

Further, some portions of embodiments can be combined with portions of other embodiments.

Figure 4:
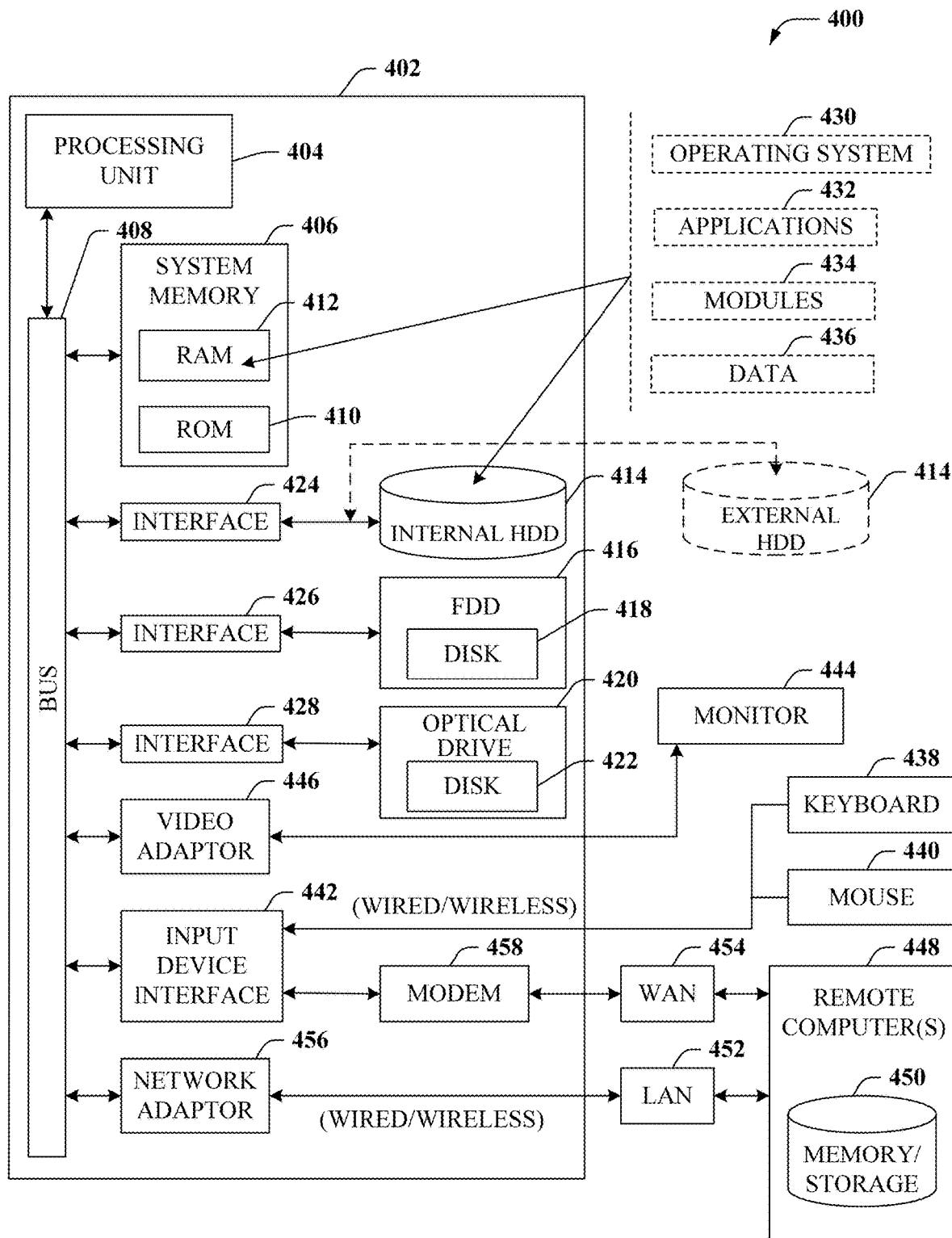
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, the computing environment 400 can be used in computing device described herein. Each of these devices can be implemented via computer-executable instructions that can run on one or more computers, and/or in combination with other program modules and/or as a combination of hardware and software. For example, computing environment 400 can facilitate in whole or in part improving the withdraw route operations of a BGP gateway device. Further, each of the BGP gateway device 100a, BGP gateway device 100b, BGP gateway device 100c, BGP gateway device 100d. BGP gateway device 100e, BGP gateway device 200a, BGP gateway device 200b, and BGP gateway device 200c can comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
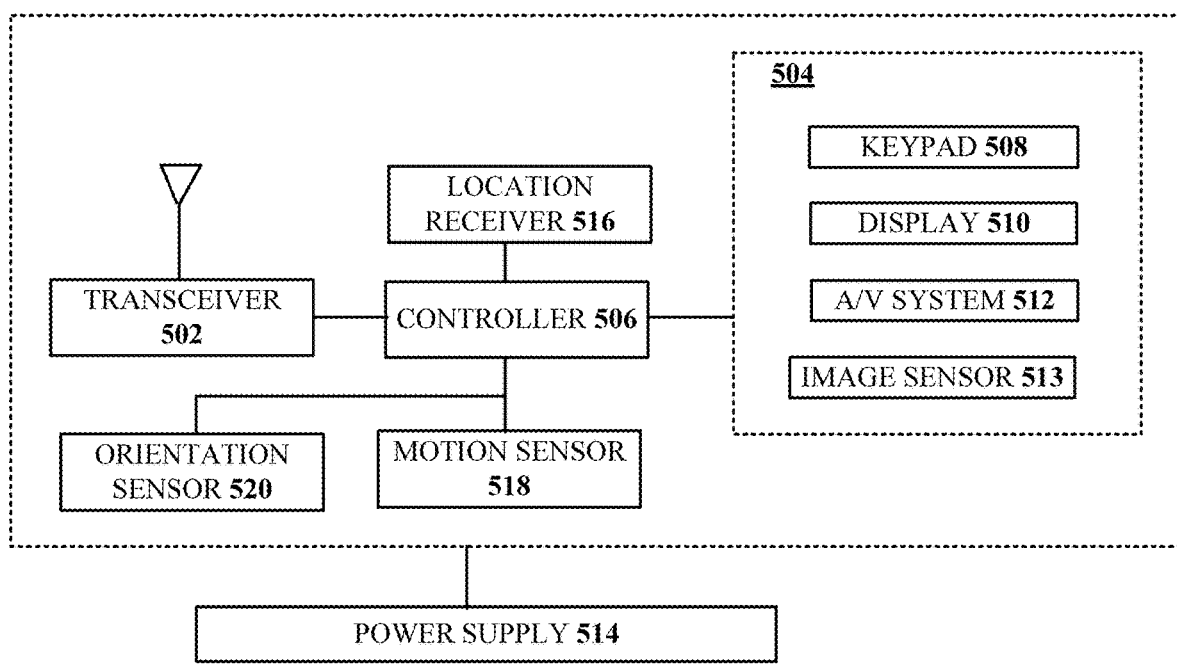
FIG. 5 is a block diagram of an example, non-limiting embodiment of a mobile network platform in accordance with various aspects described herein.

Turning now to FIG. 5, an illustrative embodiment of a communication device 500 is shown. Communication device 500 can facilitate in whole or in part improving the withdraw route operations of a BGP gateway device. Further, each of the BGP gateway device 100a, BGP gateway device 100b, BGP gateway device 100c, BGP gateway device 100d, BGP gateway device 100e, BGP gateway device 200a, BGP gateway device 200b, and BGP gateway device 200c can comprise communication device 500.

The communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X. UMTS/HSDPA, GSM/GPRS. TDMA/EDGE, EV/DO, WiMAX, SDR. LTE, as well as other next generation wireless communication technologies as they arise. The transceiver 502 can also be adapted to support circuit-switched wireline access technologies (such as PSTN), packet-switched wireline access technologies (such as TCP/IP, VOIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface having graphical user interface (GUI) elements that can be selected by a user with a touch of a finger. The display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high-volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable communications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and cast, as well as combined orientations in degrees, minutes, or other suitable orientation metrics).

The communication device 500 can use the transceiver 502 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots X_n)$, to a confidence that the input belongs to a class, that is, $f(x)$=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/ communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A first border gateway protocol (BGP) device, comprising:
   a processing system including a processor; and
   a memory that stores executable instructions that, when executed by the processing system, facilitate performance of operations, the operations comprising:
   establishing a BGP session between the first BGP device and a second BGP device, wherein the establishing of the BGP session comprises establishing use of an identifier associated with a group of routes from the second BGP device in a Network Layer Reachability Information (NLRI) field of a BGP update message;
   generating the identifier during establishment of the BGP session, wherein the identifier is different than an identifier of the second BGP device;
   receiving route advertisements from the second BGP device;
   associating the identifier with the route advertisements;
   maintaining a list of prefixes associated with the second BGP device, wherein the identifier is associated with the list of prefixes;
   maintaining a BGP routing table separate from the list of prefixes, wherein the maintaining of the BGP routing table comprises updating the BGP routing table based on the identifier associated with the list of prefixes; and
   providing the identifier with the route advertisements to a third BGP device.

2. The first BGP device of claim 1, wherein the generating the identifier comprises generating an unsigned 32-bit integer.

3. The first BGP device of claim 2, wherein the providing of the identifier comprises inserting the unsigned 32-bit integer within a Network Layer Reachability Information (NLRI) field of a BGP update message.

4. The first BGP device of claim 3, wherein the third BGP device receives the BGP update message from the first BGP device.

5. The first BGP device of claim 4, wherein the third BGP device determines the identifier from the BGP update message, wherein the third BGP device updates a BGP routing table with the identifier.

6. The first BGP device of claim 1, wherein the operations comprise, prior to receiving the route advertisements, negotiating the BGP session with the third BGP device resulting in a negotiated BGP session.

7. The first BGP device of claim 6, wherein the negotiated BGP session includes a reduced withdraw operation capability.

8. A first border gateway protocol (BGP) device, comprising:
   a processing system including a processor; and
   a memory that stores executable instructions that, when executed by the processing system, facilitate performance of operations, the operations comprising:
   generating a BGP routing table;
   receiving a first BGP update message from a second BGP device;
   determining an identifier associated with route advertisements for a third BGP device from the first BGP update message, wherein the identifier is associated with a group of routes originated from the third BGP device, wherein the first BGP update message comprises a Network Layer Reachability Information (NLRI) field, wherein the NLRI field comprises the identifier, wherein the identifier is different than an identifier of the second BGP device;
   maintaining a list of prefixes associated with the third BGP device, wherein the identifier is associated with the list of prefixes, wherein the list of prefixes is separate from the BGP routing table; and
   updating the BGP routing table with the identifier associated with the list of prefixes.

9. The first BGP device of claim 8, wherein the second BGP device generates the identifier during establishment of a BGP session with the third BGP device.

10. The first BGP device of claim 8, wherein the identifier comprises an unsigned 32-bit integer.

11. The first BGP device of claim 10, wherein the second BGP device inserts the unsigned 32-bit integer within a Network Layer Reachability Information (NLRI) field of the first BGP update message.

12. The first BGP device of claim 8, wherein the operations comprise:

receiving a second BGP update message from the second BGP device, wherein the second BGP update message comprises unreachable information that indicates the third BGP device is unreachable;

withdrawing the identifier and the route advertisements from the BGP routing table based on the unreachable information.

13. The first BGP device of claim 12, wherein the unreachable information comprises the identifier.

14. The first BGP device of claim 12, wherein the unreachable information comprises the identifier within a Network Layer Reachability Information (NLRI) field of the second BGP update message.

15. A first border gateway protocol (BGP) device, comprising:
    a processing system including a processor; and
    a memory that stores executable instructions that, when executed by the processing system, facilitate performance of operations, the operations comprising:
    establishing a BGP session between the first BGP device and a second BGP device, wherein the establishing of the BGP session comprises use of an identifier associated with a group of routes from the second BGP device in a Network Layer reachability Information (NLRI) field of a BGP update message;
    generating the identifier during establishment of the BGP session, wherein the identifier is different than an identifier of the second BGP device;
    receiving route advertisements from the second BGP device;
    associating the identifier with the route advertisements;
    maintaining a list of prefixes associated with the second BGP device, wherein the identifier is associated with the list of prefixes;
    maintaining a BGP routing table separate from the list prefixes, wherein the maintaining of the BGP routing table comprises updating the BGP routing table based on the identifier associated with the list of prefixes; and
    providing a first BGP update message to a third BGP device, wherein the first BGP update message comprises the identifier with the route advertisements.

16. The first BGP device of claim 15, wherein the third BGP receives the first BGP update message from the first BGP device, wherein the third BGP device determines the identifier from the first BGP update message, wherein the third BGP device updates a BGP routing table with the identifier.

17. The first BGP device of claim 15, wherein the operations comprise determining the BGP session between the first BGP device and the second BGP device is terminated resulting in a determination.

18. The first BGP device of claim 17, wherein the operations comprise:
    generating unreachable information based on the determination;
    inserting the unreachable information into a second BGP update message; and
    providing the second BGP update message to the third BGP device.

19. The first BGP device of claim 18, wherein the third BGP device receives the second BGP update message, wherein the third BGP device determines that the second BGP device is unreachable based on the unreachable information, wherein the third BGP device withdraws the identifier and the route advertisements from the BGP routing table based on the unreachable information.

20. The first BGP device of claim 18, wherein a Network Layer Reachability Information (NLRI) field of the second BGP update message comprises the identifier.

* * * * *